(12) United States Patent
Perahia et al.

(10) Patent No.: US 10,422,641 B1
(45) Date of Patent: Sep. 24, 2019

(54) GYROSCOPE FREQUENCY TUNING TABS ON SUPPORT SPOKES

(71) Applicant: HRL Laboratories, LLC, Malibu, CA (US)

(72) Inventors: Raviv Perahia, Calabasas, CA (US); Deborah J. Kirby, Calabasas, CA (US); Logan D. Sorenson, Calabasas, CA (US); Richard J. Joyce, Thousand Oaks, CA (US)

(73) Assignee: HRL Laboratories, LLC, Malibu, CA (US)

( * ) Notice: Subject to any disclaimer, the term of this patent is extended or adjusted under 35 U.S.C. 154(b) by 207 days.

(21) Appl. No.: 15/063,201

(22) Filed: Mar. 7, 2016

Related U.S. Application Data (60) Provisional application No. 62/131,542, filed on Mar. 11, 2015.

(51) Int. Cl.
*G01C 19/56* (2012.01)

(52) U.S. Cl.
CPC .................... *G01C 19/56* (2013.01)

(58) Field of Classification Search
CPC ............... G01C 19/56; G01C 19/5628; G01C 19/5691; B81B 3/0078
USPC ..................................................... 73/504.13
See application file for complete search history.

(56) References Cited

U.S. PATENT DOCUMENTS

| | | | |
|---|---|---|---|
| 5,739,410 A | 4/1998 | Fell | |
| 5,969,465 A * | 10/1999 | Neukermans | B81B 3/0078 310/333 |
| 7,581,443 B2 | 9/2009 | Kubena et al. | |
| 8,766,745 B1 | 7/2014 | Kubena et al. | |
| 9,599,470 B1 * | 3/2017 | Kirby | G01C 25/00 |
| 2013/0305850 A1 * | 11/2013 | Davis | B64G 1/286 74/5.7 |

OTHER PUBLICATIONS

Xi, X. et al., "Structural-Acoustic Coupling Effects on the Non-Vacuum Packaging Vibratory Cylinder Gryoscope", Sensors 2013, 13, 17176-17192; doi:10.3390/s131217176, publsihed Dec. 13, 2013.*
Wu, Y. et al., "A Study of the Temperature Characteristics of Vibration Mode Axes for Vibratory Cylinder Gyroscopes", Sensors 2011, 11, 7665-7667; doi:10.3390/s110807665, published Aug. 4, 2011.*
U.S. Appl. No. 14/456,808, Kirby et al., filed Aug. 2014.
U.S. Appl. No. 14/628,182, Nguyen et al., filed Feb. 2015.
U.S. Appl. No. 14/997,203, Sorenson et al., filed Jan. 2016.
U.S. Appl. No. 14/997,423, Nguyen et al., filed Jan. 2016.
U.S. Appl. No. 14/024,506, Kirby et al., filed Sep. 2013.
U.S. Appl. No. 13/930,769, Perahia et al., filed Jun. 2013.
Lynch, D.D. "Coriolis vibratory Gyros," Symposium Gyro technology, Stuttgart Germany, Sep. 1998, pp. 1.0-1.14.

(Continued)

*Primary Examiner* — Peter J Macchiarolo
*Assistant Examiner* — Irving A Campbell
(74) *Attorney, Agent, or Firm* — Ladas & Parry (57) ABSTRACT

A gyroscope includes a cylindrical shell having a first end and a second end, a pedestal, a plurality of spokes coupled from the pedestal to the second end of the cylindrical shell, and a plurality of tuning tabs extending from one or more of the plurality of spokes.

20 Claims, 7 Drawing Sheets

(56) References Cited

OTHER PUBLICATIONS

Schwartz, D. and M'Closkey, R.T., "Decoupling of a Disk Resonator from Linear Acceleration via Mass Matrix Perturbation", J. Dyn. Sys., Meas., and Cont., Transactions of the ASME, vol. 134, pp. 021005-1-021005-10 (Aug. 2011, in press).
Benoit Hamelin, Vahid Tavassoli, and Farrokh Ayazi, "Eutectic Trimming of Polysilicon Micro Hemispherical Resonating Gyroscope", 978-1-4673-4642-9/13/, 2013 IEEE, pp. 1-4.
Gallacher, B. J., "Multimodal tuning of a ring gyroscope using laser ablation" Proc. Inst. Mech. Eng. C.,vol. 217, pp. 557-576, 2000.
Putty: M. Putty, and K. Najafi, "A micromachined vibrating ring gyroscope," in IEEE Solid State Sensors and Actuators Workshop, pp. 213-220, Hilton Head Island, SC, Jun. 1994.
D.R. Sparks, S.R.Zarabadi, J.D. Johnson, Q. Jiang, M.Chia, O.Larsen, W.Higdon, P. Castillo-Borelley , "A CMOS Integrated Surface Micromachined Angular Rate Sensor", Jun. 1997, pp. 851-854.
Jessie Rosenberg, Qiang Lin & Oskar Painter, "Static and Dynamic Wavelength Routing via the Gradient Optical Force", Nature Photonics vol. 3, pp. 478-483 (Aug. 2009).
Siddharth Tallur, Suresh Sridaran, and Sunil A. Bhave , "A monolithic radiation-pressure driven low phase noise silicon nitride opto-mechanical oscillator", Optics Express, vol. 19, Issue 24, pp. 24522-24529 (Nov. 2011).
From U.S. Appl. No. 14/997,423 (Unpublished; non publication requested) Final Office Action dated Nov. 1, 2017.

\* cited by examiner

GYROSCOPE FREQUENCY TUNING TABS ON SUPPORT SPOKES

CROSS REFERENCE TO RELATED APPLICATIONS

This application relates to U.S. patent application Ser. No. 14/024,506, filed Sep. 11, 2013, and to U.S. patent application Ser. No. 13/930,769, filed Jun. 28, 2013, and relates and claims the benefit of priority from U.S. Provisional Patent Application 62/131,542, filed Mar. 11, 2015, which is incorporated herein as though set forth in full.

STATEMENT REGARDING FEDERAL FUNDING

None.

TECHNICAL FIELD

This disclosure relates to gyroscopes and in particular to micro-scale gyroscopes.

BACKGROUND

There is a need for ever more accurate gyroscopes. In the prior art, Reference [1] below, which is incorporated herein by reference, describes gyroscope trimming for frequency tuning of the resonant modes of a gyroscope. In particular Reference [1] describes trimming to frequency tune a hemispherical resonating gyroscope (HRG), which is a large macro-scale cup sized structure with tines at the top lip of the wineglass. Tuning may be carried out either by machining the tines or chemically etching the tines. On the micro mechanical electrical system (MEMS) scale, tuning of gyroscopes has been explored both theoretically, as described in Reference [2] below, which is incorporated herein by reference, and experimentally, as described in References [3], [4] and [5] below, which are incorporated herein by reference.

There are several disadvantages with the approaches of the prior art. In almost all cases materials, such as metals, are initially added to a micro-scale structure, for example the structure described in Reference [3], so that the added material may be later ablated to tune the resonant frequencies. However, the added materials inherently lead to a low Q and frequency splits, which are the differences in resonant frequencies between one mode of resonance and another mode of resonance.

Further, where the region to be ablated is very close to the vibrating regions, trimming and therefore tuning may be difficult and very risky, as the structure may be ruined. Also the material properties of the structure may be degraded. In the case where tuning is carried out further away from the vibrating regions, surfaces are often not flat and not amenable to trimming.

In the prior art, several gyroscope resonating structures with spokes are described in references [6], [7], [8], and [9], below, which are incorporated herein by reference. The spoke structures of these prior art references generally have thicknesses that are similar to the thickness of the resonant structure, and/or are made of different materials, which leads to the disadvantages referred to above.

REFERENCES

The following references are incorporated herein by reference.

[1] Lynch, D. D. "Coriolis vibratory Gyros," Symposium Gyro technology, Stuttgart Germany, September 1998.

[2] Schwartz, D. and M'Closkey, R. T., "Decoupling of a Disk Resonator from Linear Acceleration via Mass Matrix Perturbation", J. Dyn. Sys., Meas., and Cont., Transactions of the ASME, 1-33 (August 2011, in press).

[3] Benoit Hamelin, Vahid Tavassoli, and Farrokh Ayazi, Eutectic Trimming of Polysilicon Micro Hemispherical Resonating Gyroscope, 978-1-4673-4642-9/13/2013 IEEE.

[4] Fell, C. P., "Method for matching vibration mode frequencies on a vibrating structure" U.S. Pat. No. 5,739,410, 1996.

[5] Gallacher, B. J., "Multi-modal tuning of a ring gyroscope using laser ablation" Proc. Inst. Mech. Eng. C., Vol. 217, pp. 557-76, 2000.

[6] Putty: M. Putty, and K. Najaf, "A micromachined vibrating ring gyroscope," in IEEE Solid State Sensors and Actuators Workshop, pp. 213-220, Hilton Head Island, S.C., June 199.

[7] D. R. Sparks, S. R. Zarabadi, J. D. Johnson, Q. Jiang, M. Chia, O. Larsen, W. Higdon, P. Castillo-Borelley, A CMOS Integrated Surface Micromachined Angular Rate Sensor.

[8] Jessie Rosenberg, Qiang Lin & Oskar Painter, "Static and Dynamic Wavelength Routing via the Gradient Optical Force", Nature Photonics 3, 478-483 (2009).

[9] Siddharth Tallur, Suresh Sridaran, and Sunil A. Bhave, "A monolithic radiation-pressure driven, low phase noise silicon nitrideopto-mechanical oscillator", Optics Express, Vol. 19, Issue 24, pp. 24522-24529 (2011).

What is needed are a device and method that allows for improved frequency tuning of the resonant modes of a gyroscope structure. The embodiments of the present disclosure answer these and other needs.

SUMMARY

In a first embodiment disclosed herein, a gyroscope comprises a cylindrical shell having a first end and a second end, a pedestal, a plurality of spokes coupled from the pedestal to the second end of the cylindrical shell, and a plurality of tuning tabs extending from one or more of the plurality of spokes.

In another embodiment disclosed herein, a method for frequency tuning of resonant modes of a gyroscope comprises providing a cylindrical shell having a first end and a second end, providing a pedestal, providing a plurality of spokes coupled from the pedestal to the second end of the cylindrical shell, and providing a plurality of tuning tabs extending from one or more of the plurality of spokes.

In yet another embodiment disclosed herein, a gyroscope comprises a cylindrical shell having a first end and a second end, a pedestal, and a plurality of curved spokes coupled from the pedestal to the second end of the cylindrical shell, wherein the shell, the pedestal, and each spoke comprise a dielectric, silicon or $SiO_2$.

These and other features and advantages will become further apparent from the detailed description and accompanying figures that follow. In the figures and description, numerals indicate the various features, like numerals referring to like features throughout both the drawings and the description.

BRIEF DESCRIPTION OF THE DRAWINGS

FIG. 3A shows a micro-shell with tabs on the stress relieving spokes that can be modified for tuning via laser ablation or other removal techniques.

DETAILED DESCRIPTION

In the following description, numerous specific details are set forth to clearly describe various specific embodiments disclosed herein. One skilled in the art, however, will understand that the presently claimed invention may be practiced without all of the specific details discussed below. In other instances, well known features have not been described so as not to obscure the invention.

The benefit of MEMS fabricated gyroscopes is that they can be made in near perfect batches with tight fabrication tolerances and controls. Nevertheless there may be fabrication imperfections that are difficult to overcome without significant time and expense. Therefore there is a need for the ability to finely control the frequency of MEMS gyroscope modes with post fabrication processing.

The frequency split between orthogonal modes of a micro-shell gyroscope is directly related to gyroscope sensitivity. For a perfectly symmetric gyroscope, the two orthogonal drive and sense modes are degenerate, coupling from one mode to the other mode occurs with high efficiency, and the frequency split is essentially zero. If the gyroscope is made less than symmetric, which is a common fabrication result, then the bias stability of the gyroscope is compromised and the system exhibits reduced sensitivity. To remedy this, frequency tuning is used to reduce the frequency splits between the drive and sense modes. The frequency tuning is critical for high performance gyroscopes.

Figure 1A:
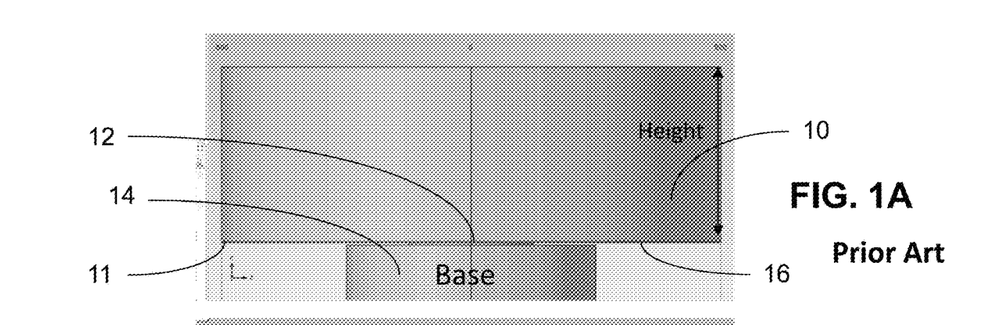
FIGS. 1A and 1B show a micro-shell gyro structure in accordance with the prior art.
Figure 1B:
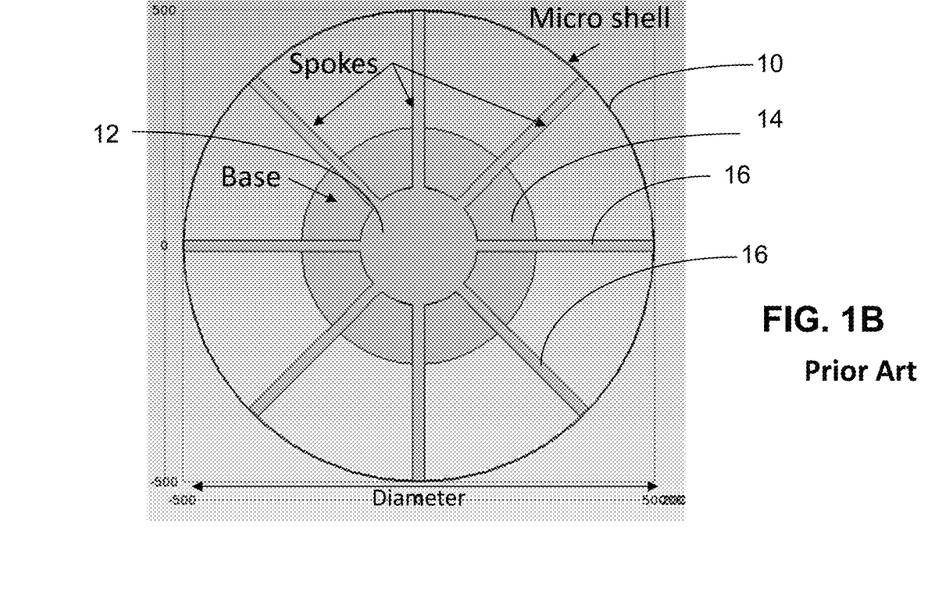

FIGS. 1A and 1B show a highly symmetric micro-shell gyroscope structure in accordance with the prior art. Such a micro-shell is described in U.S. patent application Ser. No. 14/024,506, filed Sep. 11, 2013, which is incorporated herein by reference.

FIG. 1A shows a side view of the micro-shell gyroscope structure, and shows the thin walled cylindrical micro-shell 10 supported by a pedestal 12 which is connected to a base wafer or a support structure 14. FIG. 1B shows the top down view of the micro-shell, and shows stress relieving spokes 16 that connect between the micro-shell 10 and the pedestal 12. The spokes 16 decouple stress originating at the pedestal anchor 12 from the cylindrical micro-shell 10. The spokes 16 are thin and extend from the pedestal 12 to the thickness of the bottom 11 of the micro-shell 10. The material of the micro-shell 10, the spokes 16 and the pedestal 12 may be a dielectric, and may be silicon or $SiO_2$.

Figure 2A:
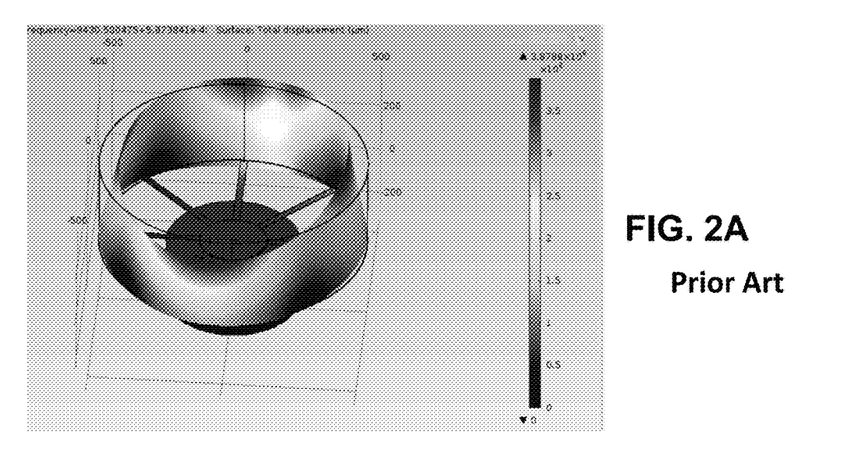
FIGS. 2A and 2B show the finite element analysis (FEA) of two low order n=2 orthogonal modes for the structure of FIGS. 1A and 1B in accordance with the present disclosure.
Figure 2B:
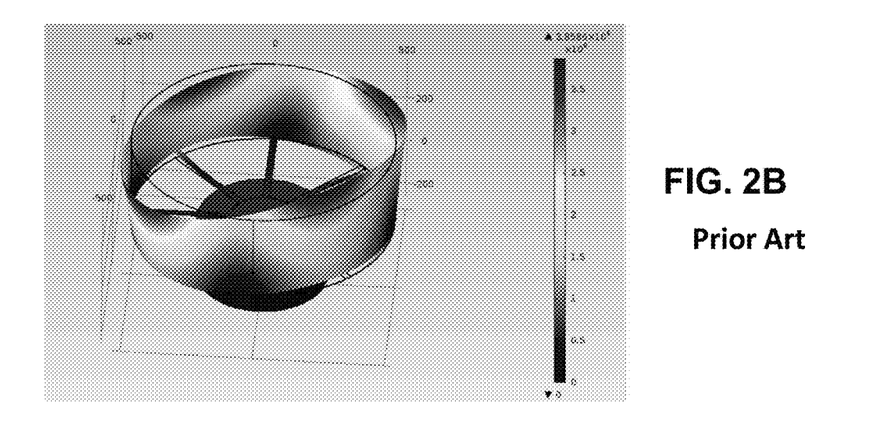

The modal structure of the device of FIGS. 1A and 1B has been analyzed using FEA modeling and the two low order n=2 orthogonal modes are shown in FIGS. 2A and 2B. The frequency split for the symmetrical micro-shell of FIGS. 1A and 1B is essentially zero.

The present disclosure describes a method of frequency tuning is described for which any frequency splitting can be reduced without any direct change to the micro-shell structure 10. The frequency tuning occurs through modifying losses between the micro-shell 10 and the pedestal anchor 12 by partially or fully removing tabs along the spokes 16 as further described below.

Figures 3A, 3D, 3F:
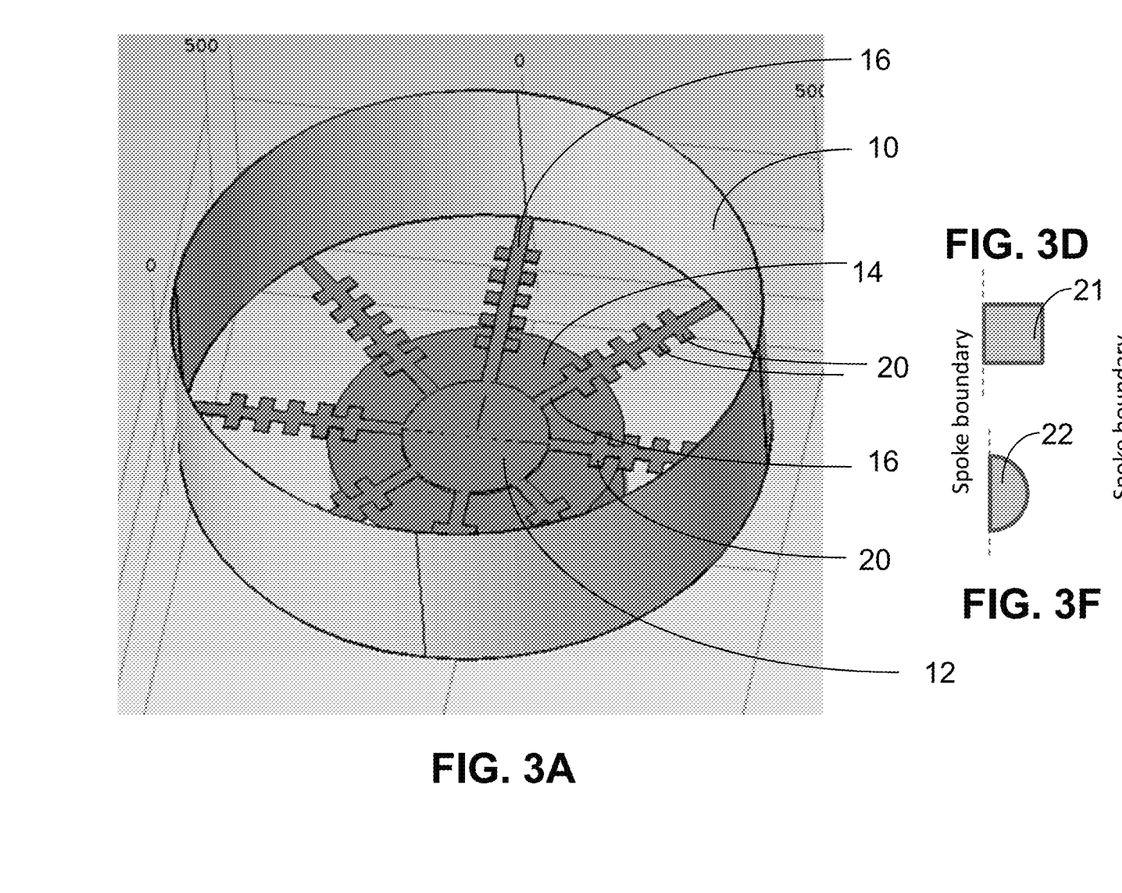
Figure 6A:
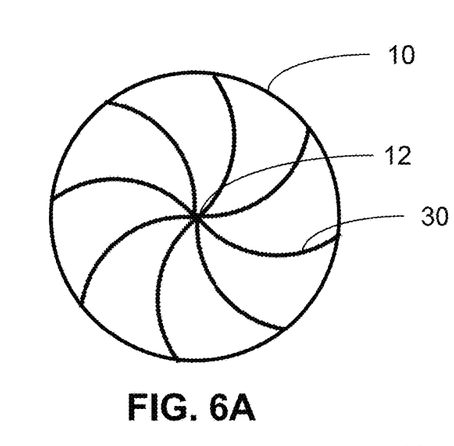
FIGS. 6A and 6B show a micro-shell with and without tabs, respectively, having curved stress relieving spokes in accordance with the present disclosure.
Figure 6B:
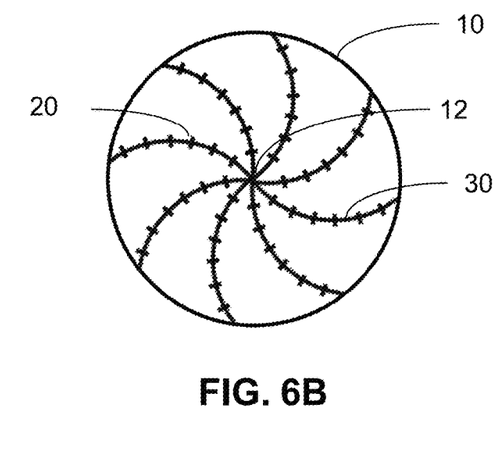
Figure 6C:
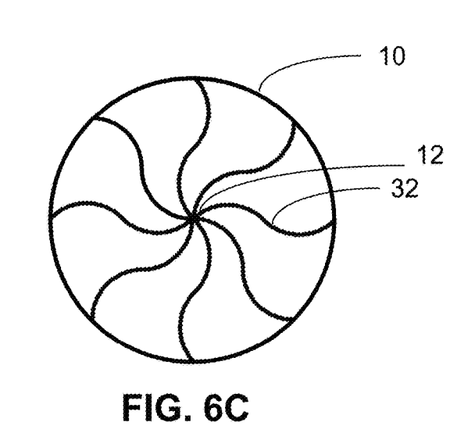
FIGS. 6C and 6D show another micro-shell with and without tabs, respectively, having another example of curved stress relieving spokes in accordance with the present disclosure.
Figure 6D:
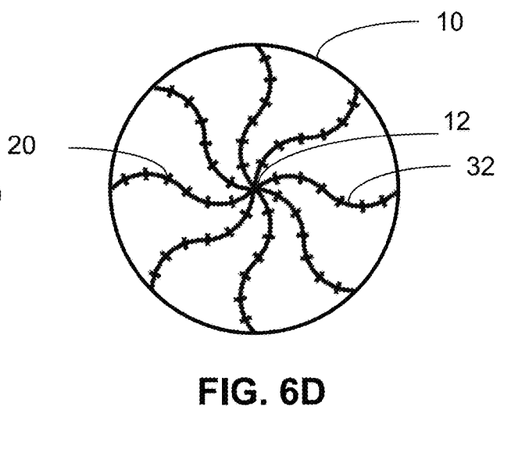

FIG. 3A shows a three dimensional (3-D) model of a micro-shell gyroscope device with tabs 20 on the spokes 16. The tabs 20 may be and preferably are integral parts of the spokes 16. In FIG. 3A the spokes are shown as straight; however, the spokes may have a curved, spiral or other complex shape. FIG. 6A shows a micro-shell 10 that has curved stress relieving spokes 30 without tabs, and FIG. 6B shows a micro-shell 10 that has curved stress relieving spokes 30 with tabs 20 in accordance with the present disclosure. FIG. 6C shows a micro-shell 10 that has another example of curved stress relieving spokes 32 without tabs, and FIG. 6D shows a micro-shell 10 that has curved stress relieving spokes 32 with tabs 20 in accordance with the present disclosure.

The tabs 20 add to the mass of the spokes 20, and may have various shapes and or sizes, including those shown in FIGS. 3D, 3E, 3F, and 3G, which show shapes of a rectangle 21, a semi-disk 22, a rectangle 23 on an extension 24, and a disk 25 on an extension 26, respectively. The extensions 24 and 26 may be relatively narrower than the shape on the extension.

Figure 3B:
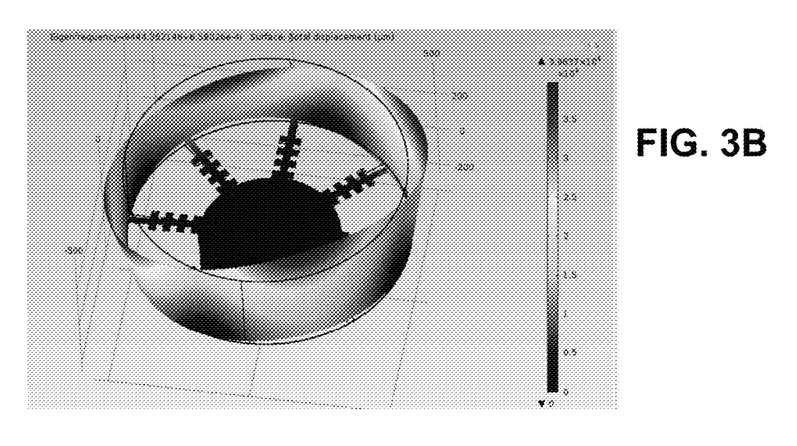
FIGS. 3B and 3C show the (FEA) of two low order n=2 orthogonal modes for the structure of FIG. 3A, and FIGS. 3D, 3E, 3F, and 3G show various shapes and/or sizes of the tabs in accordance with the present disclosure.
Figure 3C:
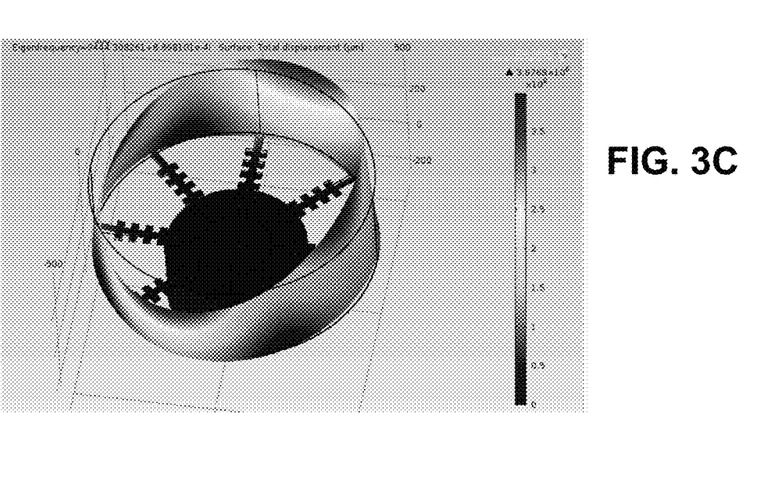
Figures 3E, 3G:
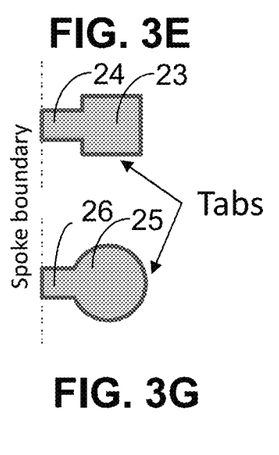

FIGS. 3B and 3C show the n=2 wine-glass modes for a micro-shell 10 with spokes 16 and tabs 20, as shown in FIG. 3A. The frequency tuning is provided for by modifying the tabs 20 via laser ablation or other removal techniques. The mechanism for tuning is to vary the amount of mass of a spoke 16 by modifying tabs 20 as necessary in order to drive the two orthogonal modes to be coincident, thereby reducing or eliminating any frequency split. Modification of the tabs 20 may involve removal or trimming of a portion or all of one or more tabs 20. As shown in FIG. 3A, there is easy access to the tabs 20 for implementation of laser ablation or other mass removal techniques, because the tabs 20 are easily accessible through the opening in the top of the micro-shell 10.

Because the tabs 20 are on the spokes 16, the tuning is performed in an area that is separate from the micro-shell 10 itself. This preserves the degree of symmetry of the micro-shell 10 previously defined during fabrication, and therefore the Q of the micro-shell 10.

Relatively coarse tuning of the resonant frequencies may be performed by partial or full removal of one or more tabs 20 farther away from the pedestal 12 and therefore closer to the micro-shell 10. The tabs 20 closer to the micro-shell 10 may also be larger and have more mass than the tabs 20 further away from the micro-shell 10 or closer to the pedestal 12 to allow for large tuning steps.

In contrast, partial or full removal of one or more tabs 20 closer to the pedestal 12 provides fine tuning, because the micro-shell 10 is less sensitive to mass changes further away from the micro-shell 10 and nearer the pedestal 12. The tabs 20 closer to the pedestal 12 may also be smaller and have less mass than the tabs 20 closer to the micro-shell 10 to allow for fine tuning steps.

The tuning tabs 20 of the present disclosure have a number of advantages over the prior art.

If frequency splitting is apparent after fabrication, strategic ablation or removal of the tabs 20 allows for tuning of the resonant modes to reduce frequency splits.

The tuning tabs 20 of the present disclosure provide passive tuning, which avoids complex electronics and their associated power consumption.

Use of touch free drive and sense technology, as described in U.S. patent application Ser. No. 13/930,769, filed Jun. 28, 2013, which is incorporated herein by reference, allows a full gyro wafer of multiple micro-shell gyros to be fabricated at the wafer scale, and then the individual micro-shell gyros tuned before separation or dicing of the micro-shells 10 and MEMS packaging.

The tabs 20 may be made from same material as the micro-shell 10 during the fabrication process of the micro-shell 10, which as described above may be a dielectric, and may be silicon or $SiO_2$. Therefore, no metal needs to be added for tuning, as described for some prior art techniques.

The vertical cylindrical nature of the micro-shell 10 allows for un-fettered access to the tabs 20 on the spokes 16 for trimming or removing the tabs 20.

While the spokes 16 may have a complex shape, such as a curved shape, the tabs 20 on the spokes may be flat or be in the same plane. Being in the same plane makes the tabs 20 on the spokes 16 amenable to an ablation process using laser machining, because a laser beam must be focused at a same height. The entire structure of the spokes 16 and the tabs 20 may also be flat or in the same plane.

A navigation grade single axis gyroscope in accordance with the present disclosure may have a bias stability of less than 0.01 deg/hr with a very small form factor of less than 1 cubic centimeter. Since MEMS structures are extremely small and may be produced with CMOS compatible wafer scale manufacturing processes, MEMS gyros of the present disclosure have significant advantages over prior art gyroscopes, such as those that use fiber optics, spinning masses, and so on, especially in applications where cost, size, weight, and power are at a premium.

Figure 4A:
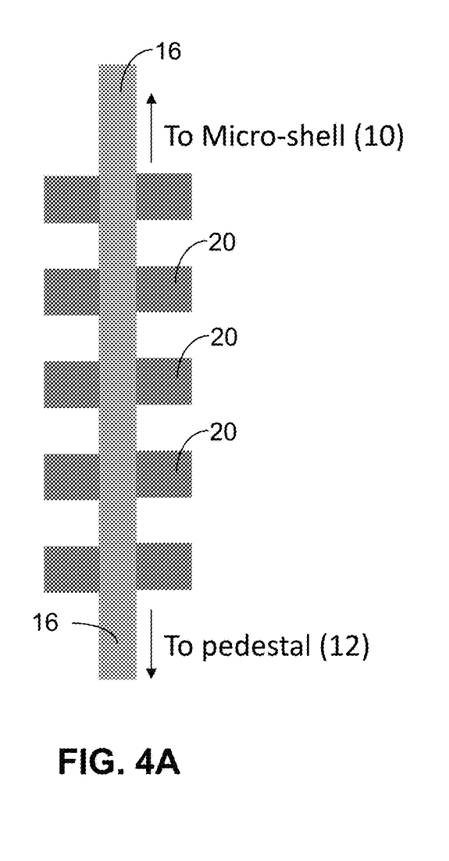
FIG. 4A shows tabs on a spoke with one end of the spoke near the micro-shell and the other end near the pedestal.
Figures 4B, 4C, 4D, 4E, 4F:
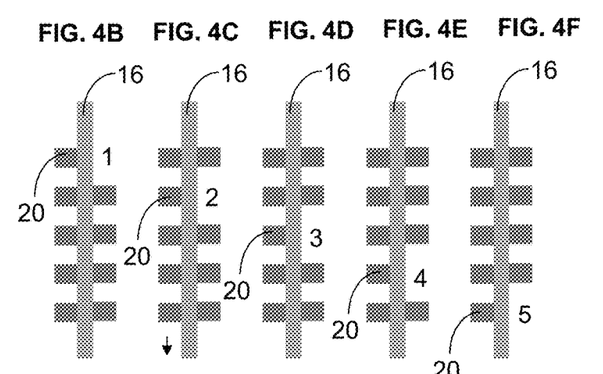
FIGS. 4B, 4C, 4D, 4E and 4F show tuning by removing single tabs at five different locations or tab indexes 1 to 5 along the spoke.
Figures 4G, 4H, 4I, 4J, 4K:
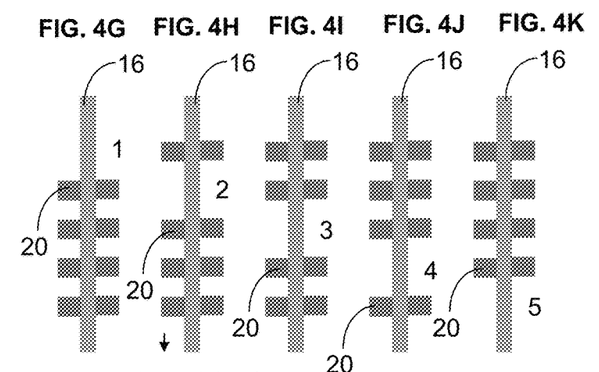
FIGS. 4G, 4H, 4I, 4J and 4K show tuning by removing two tabs or double tabs at five different locations or tab indexes 1 to 5 along the spoke in accordance with the present disclosure.

FIG. 4A shows tabs 20 on a spoke 16 with one end of the spoke 16 near the micro-shell 10 and the other end of the spoke 16 near the pedestal 12. As shown in the FIG. 4A, the tabs 20 may be pairs of tabs 20 arranged along the length of the spoke 16. FIGS. 4B, 4C, 4D, 4E and 4F show tuning by removing single tabs 20 at five different locations or tab indexes 1 to 5 along the spoke 16. FIGS. 4G, 4H, 4I, 4J and 4K shows tuning by removing a pair of two tabs 20 at a same radius along the spoke 16, which may be referred to as double tabs 20, at five different locations or tab indexes 1 to 5 along the spoke 16. The tab indexes or tab locations 1 to 5 move progressively closer to the pedestal 12 and away from the micro-shell 10.

Figure 5A:
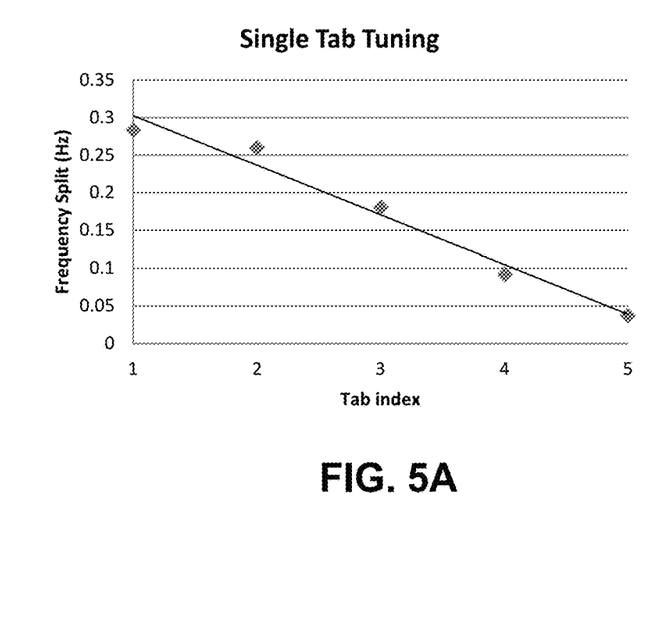
FIG. 5A shows a graph of frequency splits for the micro-shell of FIG. 3A corresponding to removing single tabs at the five tab indexes 1 to 5 as shown in FIGS. 4B, 4C, 4D, 4E and 4F.

FIG. 5A shows a graph of frequency splits for the micro-shell 10 of FIG. 3A corresponding to removing single tabs 20 at the five tab indexes 1 to 5 as shown in FIGS. 4B, 4C, 4D, 4E and 4F. FIG. 5A shows a near linear tuning of the frequency splits from approximately 300 milliHertz (mHz) down to approximately 40 mHz for a range of tuning of approximately 260 mHz as the position of a removed single tab progresses closer to the pedestal 12 and further away from the micro-shell 10.

Figure 5B:
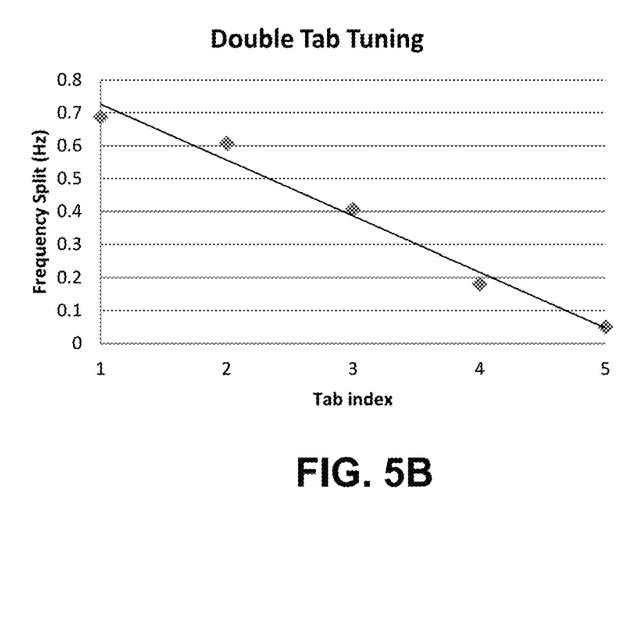
FIG. 5B shows a graph of frequency splits for the micro-shell of FIG. 3A corresponding to removing double tabs at the five tab indexes 1 to 5 as shown in FIGS. 4G, 4H, 4I, 4J and 4K in accordance with the present disclosure.

FIG. 5B shows a graph of frequency splits for the micro-shell 10 of FIG. 3A corresponding to removing double tabs 20 at the five tab indexes 1 to 5 as shown in FIGS. 4G, 4H, 4I, 4J and 4K. FIG. 5B shows a near linear tuning of the frequency splits from approximately 700 milliHertz (mHz) down to approximately 50 mHz for a range of tuning of approximately 650 mHz as the position of removed double tabs 20 progresses closer to the pedestal 12 and further away from the micro-shell 10.

By selecting various shapes and masses of the tabs 20 and by partially or fully removing selective tabs 20, the present disclosure provides a range of frequency tuning from 10s of Hertz to milliHertz of frequency.

Having now described the invention in accordance with the requirements of the patent statutes, those skilled in this art will understand how to make changes and modifications to the present invention to meet their specific requirements or conditions. Such changes and modifications may be made without departing from the scope and spirit of the invention as disclosed herein.

The foregoing Detailed Description of exemplary and preferred embodiments is presented for purposes of illustration and disclosure in accordance with the requirements of the law. It is not intended to be exhaustive nor to limit the invention to the precise form(s) described, but only to enable others skilled in the art to understand how the invention may be suited for a particular use or implementation. The possibility of modifications and variations will be apparent to practitioners skilled in the art. No limitation is intended by the description of exemplary embodiments which may have included tolerances, feature dimensions, specific operating conditions, engineering specifications, or the like, and which may vary between implementations or with changes to the state of the art, and no limitation should be implied therefrom. Applicant has made this disclosure with respect to the current state of the art, but also contemplates advancements and that adaptations in the future may take into consideration of those advancements, namely in accordance with the then current state of the art. It is intended that the scope of the invention be defined by the Claims as written and equivalents as applicable. Reference to a claim element in the singular is not intended to mean "one and only one" unless explicitly so stated. Moreover, no element, component, nor method or process step in this disclosure is intended to be dedicated to the public regardless of whether the element, component, or step is explicitly recited in the Claims. No claim element herein is to be construed under the provisions of 35 U.S.C. Sec. 112, sixth paragraph, unless the element is expressly recited using the phrase "means for . . . " and no method or process step herein is to be construed under those provisions unless the step, or steps, are expressly recited using the phrase "comprising the step(s) of . . . ."

What is claimed is:

1. A gyroscope comprising:
a resonant cylindrical shell having a first end and a second end;
a pedestal; and
a plurality of spokes coupled from the pedestal to the second end of the resonant cylindrical shell;
wherein each of the plurality of spokes comprises:
a bar; and
a plurality of tuning tabs extending from the bar along a length of the bar;
wherein a first plurality of first tuning tabs of the plurality of tuning tabs are on a first side of a respective bar and a second plurality of second tuning tabs of the plurality of tuning tabs are on a second side of the respective bar; and
wherein the first tuning tabs and the second tuning tabs are aligned across from one another along the length of the respective bar.

2. The gyroscope of claim 1 wherein:
the resonant cylindrical shell comprises a dielectric, silicon or $SiO_2$;
the pedestal comprises a dielectric, silicon or $SiO_2$;
each spoke comprises a dielectric, silicon or $SiO_2$; and
each tuning tab comprises a dielectric, silicon or $SiO_2$.

3. The gyroscope of claim 1 wherein:
a spoke of the plurality of spokes has a straight or curved shape.

4. The gyroscope of claim 1 wherein:
a tuning tab of the plurality of tuning tabs has a rectangular shape, a disk shape, a semi-disk shape, a rectangle on an extension, a disk on an extension, or a semi-disk on an extension.

5. The gyroscope of claim 1 wherein:
at least one spoke has a pair of tuning tabs arranged on either side of the spoke along a length of the spoke.

6. The gyroscope of claim 1 wherein:
a tuning tab nearer to the resonant cylindrical shell on a spoke of the plurality of spokes has more mass than a tuning tab closer to the pedestal.

7. The gyroscope of claim 1 wherein:
a same configuration of the plurality of tuning tabs extend from each spoke of the plurality of spokes.

8. The gyroscope of claim 1 wherein:
each tuning tab of the plurality of tuning tabs has a similar mass, or similar shape.

9. The gyroscope of claim 1 wherein:
at least one spoke has a different configuration of the plurality of tuning tabs along the spoke than another spoke of the plurality of spokes.

10. The gyroscope of claim 1 wherein:
the plurality of tuning tabs are flat or in the same plane.

11. A method for frequency tuning of resonant modes of a gyroscope comprising:
providing a resonant cylindrical shell having a first end and a second end;
providing a pedestal; and
providing a plurality of spokes coupled from the pedestal to the second end of the resonant cylindrical shell;
wherein each of the plurality of spokes comprises:
a bar; and
a plurality of tuning tabs extending from the bar along a length of the bar;
wherein a first plurality of first tuning tabs of the plurality of tuning tabs are on a first side of a respective bar and a second plurality of second tuning tabs of the plurality of tuning tabs are on a second side of the respective bar; and
wherein the first tuning tabs and the second tuning tabs are aligned across from one another along the length of the respective bar.

12. The method of claim 11 further comprising:
trimming a portion of a tuning tab or all of a tuning tab for frequency tuning of a resonant mode.

13. The method of claim 12 wherein:
trimming comprises using a laser.

14. The method of claim 12 wherein:
trimming a tuning tab nearer to the resonant cylindrical shell or further from the pedestal on a spoke of the plurality of spokes provides coarse frequency tuning; and
trimming a tuning tab further from the resonant cylindrical shell or closer to the pedestal on a spoke of the plurality of spokes provides fine frequency tuning.

15. The method of claim 12 wherein:
the frequency tuning ranges from 10s of Hertz to milli-Hertz of frequency.

16. The method of claim 11 wherein:
the resonant cylindrical shell comprises a dielectric, silicon or $SiO_2$;
the pedestal comprises a dielectric, silicon or $SiO_2$;
each spoke comprises a dielectric, silicon or $SiO_2$; and
each tuning tab comprises a dielectric, silicon or $SiO_2$.

17. The method of claim 11 wherein:
a spoke of the plurality of spokes has a straight or curved shape.

18. The method of claim 11 wherein:
a tuning tab of the plurality of tuning tabs has a rectangular shape, a disk shape, a semi-disk shape, a rectangle on an extension, a disk on an extension, or a semi-disk on an extension.

19. The method of claim 11 wherein:
a tuning tab nearer to the resonant cylindrical shell on a spoke of the plurality of spokes has more mass than a tuning tab closer to the pedestal.

20. The method of claim 11 wherein:
the plurality of tuning tabs are flat or in the same plane.

* * * * *